United States Patent [19]

Vaughn

[11] Patent Number: 5,660,284

[45] Date of Patent: Aug. 26, 1997

[54] STORAGE RACK FOR CONTAINER LIDS

[76] Inventor: Richard C. Vaughn, RD 2, Box 19F, Clarkesville, Del. 19970

[21] Appl. No.: 497,425

[22] Filed: Jun. 30, 1995

Related U.S. Application Data

[63] Continuation-in-part of Ser. No. 243,319, May 16, 1994, abandoned.

[51] Int. Cl.⁶ .................................................. A47G 19/08
[52] U.S. Cl. .......................... 211/41.1; 211/175; 211/186; 211/206
[58] Field of Search ............................... 211/41, 13, 189, 211/206, 186, 175, 43

[56] References Cited

U.S. PATENT DOCUMENTS

| | | | |
|---|---|---|---|
| 601,753 | 4/1898 | Kaiser | 211/41 |
| 1,065,000 | 6/1913 | Sarter et al. | 211/41 |
| 1,266,245 | 5/1918 | Fuhrmann | 211/41 |
| 1,528,744 | 2/1925 | Dix | 211/41 |
| 1,714,266 | 5/1929 | Johnson | 211/41 |
| 2,443,404 | 6/1948 | Tallarico | 211/41 |
| 2,634,865 | 4/1953 | Geheb | 211/41 |
| 5,000,326 | 3/1991 | Vaughn | 211/41 |

*Primary Examiner*—Alvin C. Chin-Shue
*Assistant Examiner*—Anita King
*Attorney, Agent, or Firm*—Sixbey, Friedman, Leedom & Ferguson, P.C.; Joan K. Lawrence

[57] ABSTRACT

An improved storage rack for holding and storing cooking container lids and like-shaped objects is provided. The rack has a support frame which holds a number of container lids at an optimum storage angle when the rack is in a vertical or a horizontal orientation. The optimum storage angle is achieved by an assembly of bracket members, side rails and crosspieces which may be infinitely adjustably attached to the bracket members or side rails to form the rests and stops required to hold a number of different sizes of lids at the optimum storage angle. A single size, longitudinally adjustable crosspiece is provided to form the horizontal rests and stops required to support the lids at the optimum storage angle. The storage rack may be formed of a combination of materials and in sizes suitable for use in a home or commercial kitchen environment.

20 Claims, 6 Drawing Sheets

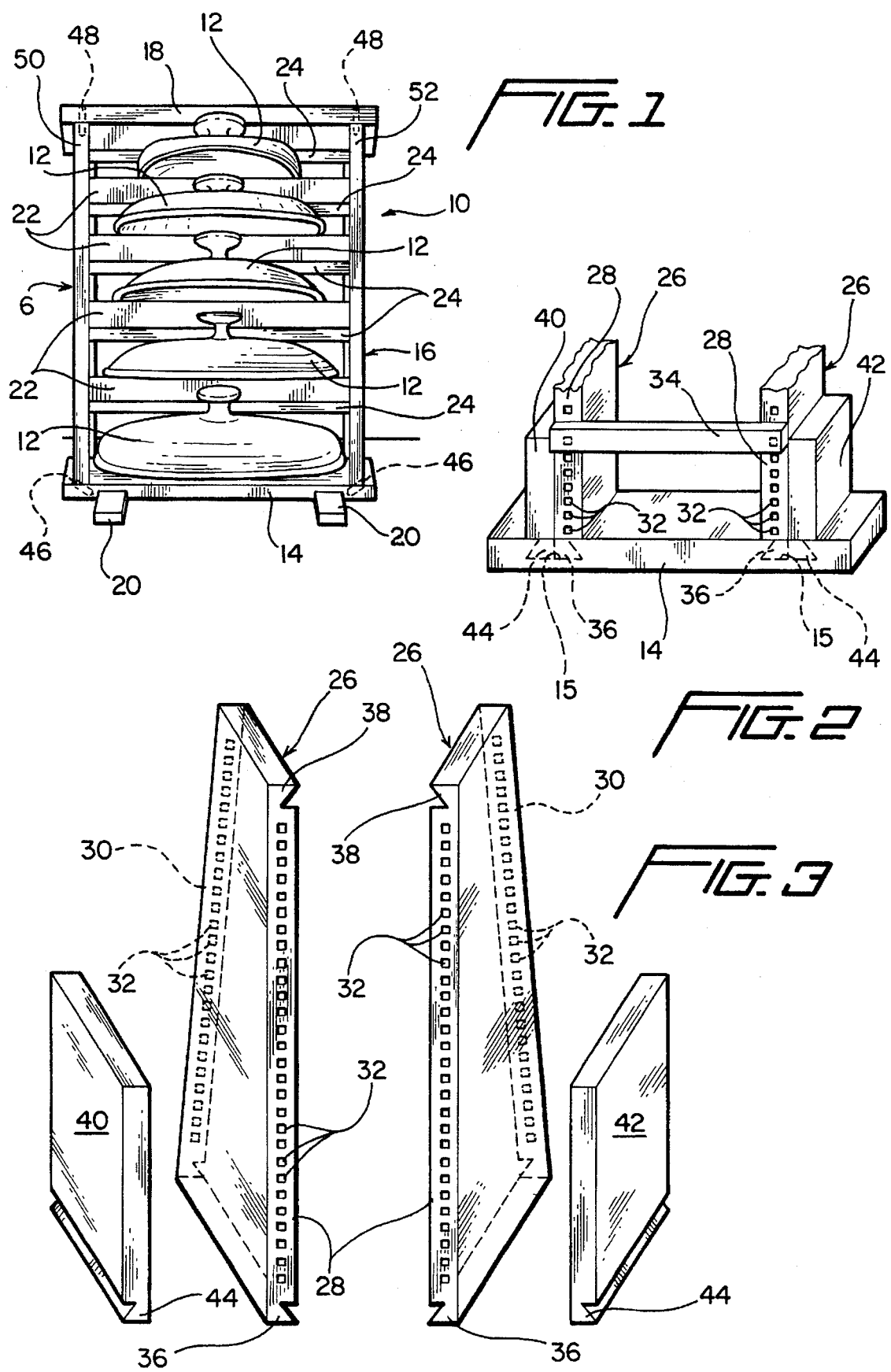

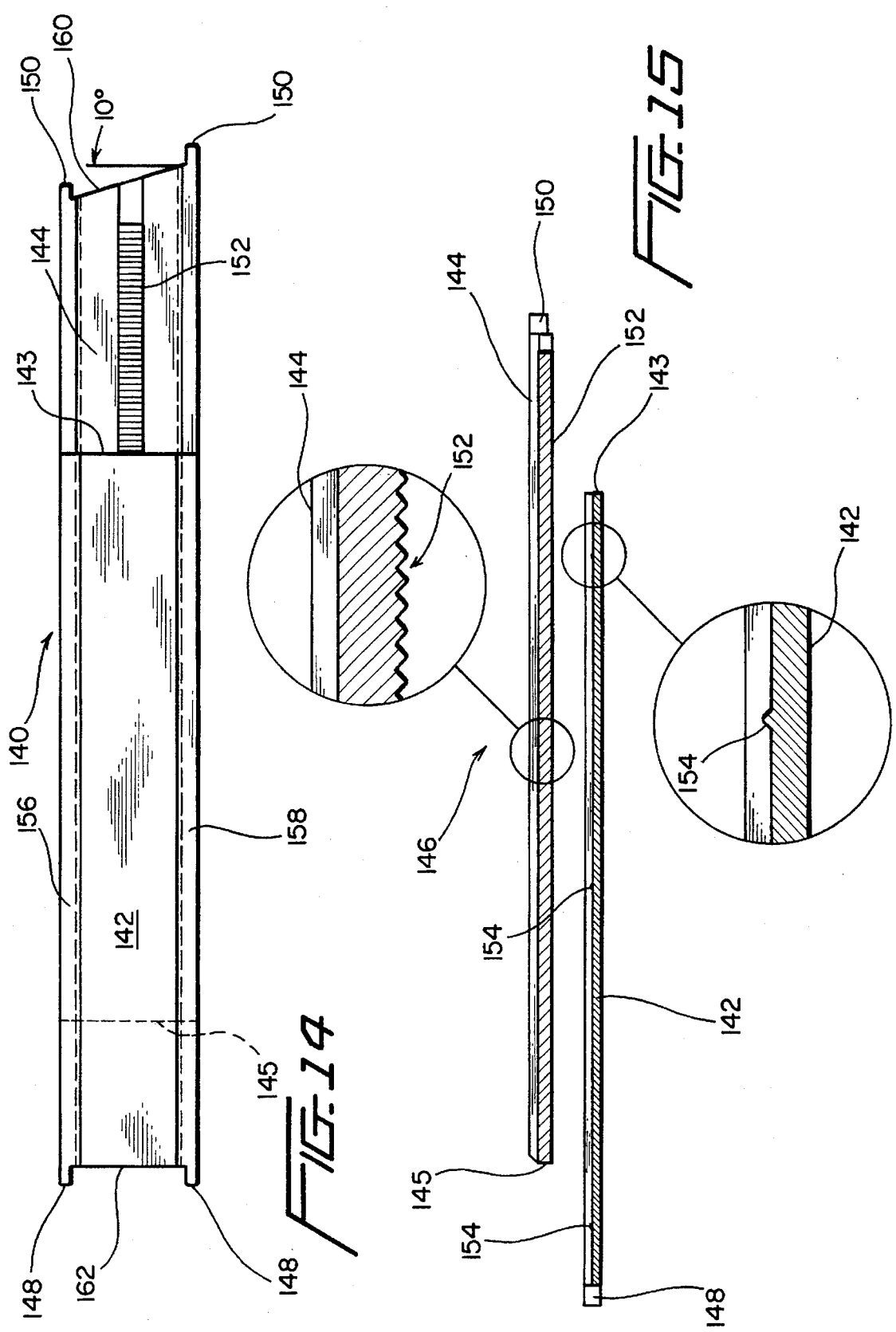

STORAGE RACK FOR CONTAINER LIDS

This is a continuation-in-part of U.S. patent application Ser. No. 08/243,319, filed May 16, 1994 now abandoned.

TECHNICAL FIELD

The present invention relates generally to racks and holders for kitchen implements and specifically to an improved adjustable multiple position rack for holding container lids and like-shaped objects.

BACKGROUND OF THE INVENTION

Most cooks, whether amateur or professional, have accumulated a collection of covered cookware that may range from small saucepans to large soup pots and include many other sizes of pots and pans and containers with lids. Even most of those householders who do not consider themselves real cooks have an assortment of covered containers in which to cook food both on top of a stove and in an oven. Restaurant and other commercial kitchens, moreover, may have very large numbers of pots, pans and other cooking containers. In both situations, the cooking containers and their respective lids must be stored when they are not in use. This problem, moreover, may be compounded by the lack of storage space in many kitchens.

Where and how these kitchen implements are stored may vary substantially from kitchen to kitchen. In some instances, pots and cooking containers are stacked in a nested fashion with the largest diameter pot on the bottom and successively smaller pots on top. While this might be a relatively efficient way to store pots, pans and other cooking vessels such as casseroles, the lids and covers usually cannot be stored effectively in a nested stack. Most kitchens, whether home or commercial, which use this storage method for pots also have a disorganized pile of lids and covers. The cook then must hunt through the pile to locate the correct lid for the container he or she wants to use. In a home kitchen this is primarily very frustrating. However, in a commercial kitchen, it can be costly since the time spent hunting for lids is time diverted from cooking or other productive tasks.

Some cooks simply cover their pots and pans with the lids and store them side-by-side, on cabinet shelves. Although this method allows the cook to locate the correct lid quickly, it requires significantly more storage space than stacking or nesting the containers. Many home kitchens simply do not have the storage space to store in this fashion the numbers of cooking containers required by large families or serious cooks. In addition, the side-by-side storage of covered containers is not usually the most effective use of storage space in a commercial kitchen.

The manufacturers of custom kitchen cabinetry for home kitchens typically include a wide range of storage options designed to organize kitchen implements. However, the efficient storage of lids for cooking containers, as far as Applicant is aware, has not been addressed by kitchen cabinet manufacturers. Nor do the manufacturers of commercial kitchen storage equipment appear to have dealt with this problem.

Limited solutions have been proposed by the prior art to solve the lid storage problem. For example, U.S. Pat. Nos. 601,753 to Kaiser; 1,065,000 to Sarter et at.; 1,266,245 to Fuhrmann; and 1,528,744 to Dix all disclose holders and racks for kitchen articles, including cooking container lids. All of these racks are designed to be used only in a vertical position, preferably hung on a wall. Many kitchens, especially home kitchens, simply do not have the wall space to accommodate such a rack. Additionally, the racks disclosed by Kaiser and Fuhrmann will not hold lids of varying heights. None of the other racks, moreover, provides the adjustability required to store the varied collection of different sizes of cooking container lids and covers found in most home kitchens. Not only are the lids and covers found in most kitchens likely to have different diameters, but the depth and knob height is usually different as well. As a result, a truly useful storage rack must be sufficiently adjustable to hold all of the cook's lids and covers, no matter how varied in size and shape the collection is. None of the racks disclosed in the foregoing patents, moreover, is particularly well adapted to the storage demands of a large commercial kitchen.

U.S. Pat. No. 5,000,326, issued to the inventor herein, discloses an adjustable rack or holder for cooking container lids that provides module elements sized and adjustable to accommodate container lids of different heights. This rack may be used in either a horizontal or a vertical orientation to store container lids. While the lid-holding structure described in this patent overcomes the disadvantages of the aforementioned prior art arrangements, it is not as adjustable enough to accommodate the wide variations in lid size, shape and design common throughout the United States and international marketplace. In addition, the module arrangement described in the Applicant's aforementioned patent is easier for a cabinetmaker than a consumer to assemble to the desired degree of adjustability.

The prior art, therefore, has failed to provide an adjustable storage rack or holder for cooking container lids and covers that may be easily assembled by an experienced cabinetmaker or by a consumer, that may be positioned in one of several convenient orientations in a home or commercial kitchen, and which can be easily adjusted as needed to hold and store a number of lids of varying and different dimensions. Consequently, there is a need for such a rack in both home and commercial kitchens to allow storage areas to be organized effectively and efficiently to reduce clutter and provide the time savings which result when storage spaces are organized.

SUMMARY OF THE INVENTION

It is a primary object of the present invention, therefore, to provide a rack for cooking container lids or like-shaped objects that overcomes the disadvantages of the prior art.

It is a specific object of the present invention to provide a multiple position storage rack for covers and lids for cooking containers that may be easily assembled and adjusted by the consumer to hold a number and variety of lids with different dimensions.

It is another object of the present invention to provide a multiple position holding and storage rack for cooking container covers and lids which effectively supports the lids in an optimum storage angle when it is positioned in a vertical orientation or in a horizontal orientation.

It is yet another object of the present invention to provide a multiple position storage rack for cooking container covers and lids which can be custom assembled by the purchaser or consumer to accommodate a specific collection of lids without tools, fasteners or adhesives.

It is a further object of the present invention to provide a fixed storage rack for cooking container lids that is sized to hold all of the lids for a selected set or brand of cookware.

It is yet a further object of the present invention to provide a multiple position storage rack for cooking container covers and lids which can be effectively adapted to hold securely either the relatively small number of lids found in a typical home kitchen or the large number of lids found in a commercial kitchen.

It is a still further object of the present invention to provide an adjustable storage rack for cooking container lids and covers which can be adapted for use as a component of custom made kitchen cabinetry.

It is still another object of the present invention to provide an adjustable, easily assembled storage or display rack for a variety of sizes of container lids that is formed from a minimum number of components.

The foregoing objects are accomplished by providing a fully adjustable rack or holder for cooking container lids and covers or like-shaped objects designed to hold a number of lids and covers seemly in an optimum storage angle when the rack is in a vertical or in a horizontal orientation that can be easily assembled or disassembled without tools. The rack of the present invention has a supporting frame that includes a base member which mounts and supports at a selected optimum storage angle a pair of side elements and a cap member opposite the base member which holds side elements in place at a predetermined optimum angle with respect to the base member. Each side element supports a pair of spaced side rails, each of which includes a series of spaced apertures or protrusions and grooves formed at a predetermined optimum angle. The angle can vary from 90° relative to the base to about 74° relative to the base. A number of adjustable crosspieces with projections sized and shaped to removably fit into the grooves on the side rails is provided to extend between the side elements, forming rests or stops to support the lids in an optimum storage position. Once the desired number of crosspieces has been fitted into the side rails, the side rails may be covered with finished trim pieces to provide a more aesthetically pleasing appearance. The base member includes a pair of feet spaced inwardly from the outer edges of the base member. The length of the feet is selected to provide sufficient clearance between a vertical or horizontal surface and the largest size container lid to be stored in the rack. A nonadjustable or fixed position rack designed to hold a set of lids having the same height made by a single manufacturer is also provided. The dimensions of the base and cap members and side elements can be conveniently varied as desired and will usually be selected according to the end use and/or orientation in which the rack is to be used. A single adjustable crosspiece has been designed to be used with a wide range of base, cap and side dimensions. The supporting frame cap member may include mounting structure for installing the rack on a wall or other vertical surface. The supporting frame may be constructed of a combination of wood and durable plastic or other suitable material selected to decrease the weight of the rack.

Other objects and advantages will be apparent from the following description, claims and drawings.

BRIEF DESCRIPTION OF THE DRAWINGS

FIG. 1 illustrates one embodiment of the adjustable storage rack of the present invention in front perspective view;

FIG. 2 illustrates in from perspective the base section and a portion of the side elements of the storage rack of FIG. 1;

FIG. 3 illustrates a perspective view of one embodiment of the side rails and optional assembly blocks of the present invention;

FIG. 14 illustrates a front view of an adjustable crosspiece in accordance with a preferred embodiment of the present invention; and FIG. 15 illustrates, schematically in top cross-sectional view, detail of the locking structure of the adjustable crosspiece of FIG. 11.

DESCRIPTION OF THE PREFERRED EMBODIMENTS

Figure 4:
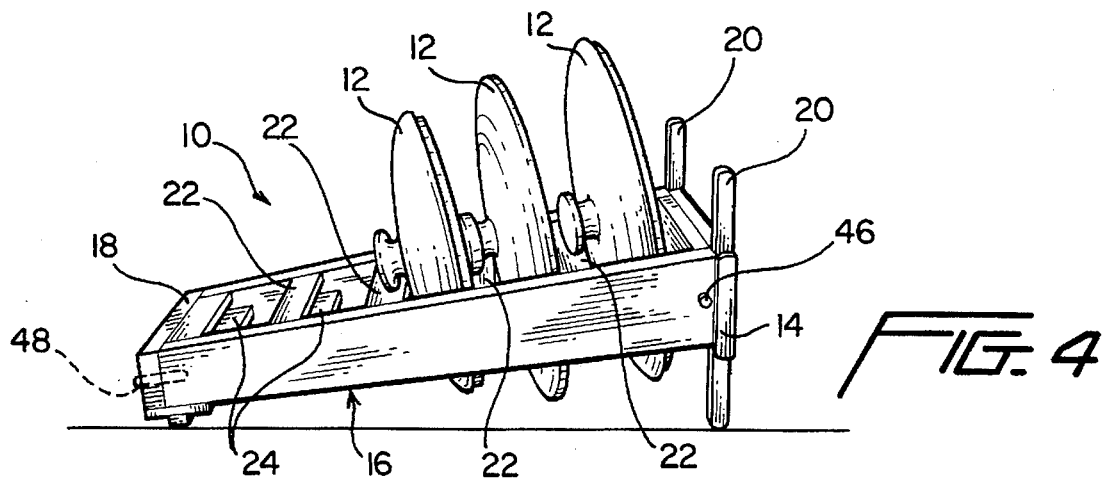
FIG. 4 illustrates the storage rack of FIG. 1 in side perspective view.

The cooking container lid storage rack of the present invention is ideally suited for both the home and the commercial kitchen. It provides a compact storage rack for container lids and covers that allows easy access to the lids and covers when the rack is in either a vertical or a horizontal orientation. The unit may be constructed to hold any number of covers and lids from the relatively small number found in a typical home kitchen to the very large numbers found in a large commercial kitchen. Moreover, the capability to vary the dimensions of the lid-supporting components of the rack allows the consumer to customize the rack as needed to hold a varied assortment of lids. The preferred embodiment of the storage rack of the present invention is designed to be assembled by the user and is fully adjustable to hold a number of lids of different heights and diameters at an optimum storage angle. Another embodiment of the present storage rack is specifically configured to hold a set of lids or covers for a matched set of cookware or lids that are all the same height, but have different diameters and is not adjustable.

Referring specifically to the drawings, FIG. 1 illustrates one embodiment of a container lid storage rack 10 in accordance with the present invention. This rack is shown holding cooking container lids 12 of different diameters and heights. The supporting frame of the rack 10 is similar in many respects to the frame of the lid caddy shown and described in the inventor's U.S. Pat. No. 5,000,326, the disclosure of which is hereby incorporated by reference. The supporting frame includes a base 14, a pair of side elements 16 and a top or cap 18. The dimensions of the supporting frame sections will depend on whether the storage rack is intended for a home or a commercial kitchen. This particular embodiment of the present storage rack is designed to be assembled by the user to accommodate a diverse collection of cooking container lids. Consequently, all of the pieces are intended to fit together without fasteners, although fasteners could be used, if desired.

The term "cooking container" is used throughout to mean containers of all kinds used for cooking food, including, but not limited to pots, pans and casserole-type baking dishes made of metal, glass, ceramics and the like. Most of these containers are round in shape, and the lids illustrated are also essentially round in shape. However, the rack of the present invention will support square, rectangular, elliptical and other shapes of lids as well as round lids. In addition, the storage rack of the present invention can also be used to hold other objects, such as, for example, dishes and trays, that are shaped like container lids. The rack 10 in FIG. 1 is shown in a vertical orientation on a flat surface, such as a kitchen countertop, table or the like, although it would have a similar appearance hanging on a wall.

The rack has a substantially rectangular configuration in this embodiment to provide the flexibility needed to accommodate lids of different diameters. The base 14 includes a pair of feet 20 which both stabilize the rack 10 when it is in a free-standing vertical position, such as on a kitchen countertop or table, and maintain the desired spacing between the rack and a vertical wall surface or between the rack and a horizontal surface, as will be described in connection with FIG. 4. The base 14 also includes a pair of spaced hidden dovetail channels 15 which support side elements as will be described in detail hereinbelow.

Container lids stored in the rack of the present invention are held at an optimum storage angle by a combination of adjustable rests and stops which are spaced by the user to hold the desired number of lids in this optimum storage position. FIG. 1 illustrates a set of lids 12 supported on corresponding rests 22 and held at an optimum storage angle by stops 24.

Lids of different heights can be stored securely in the same unit simply by varying the spacing between the rests, as will be explained in detail below. The positions of both the rests 22 and the stops 24 are fully adjustable and can be varied as needed to support lids of different heights at an optimum storage angle relative to the frame side elements 16. This feature not only allows easy access to a selected lid without disturbing the adjacent lids, but also permits the rack 10 to be placed in a vertical position or a horizontal position and still hold the lids securely so they do not fall out of the rack.

Figure 6:
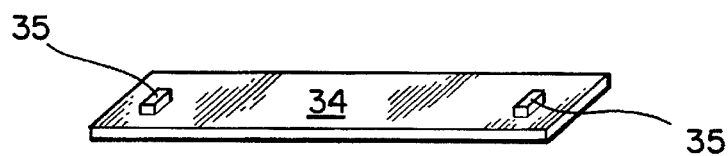
FIG. 6 illustrates a crosspiece and positioning projections of the FIG. 1 embodiment of the present invention.

FIGS. 2 and 3 illustrate the construction of the storage rack 10 of this embodiment which affords the user maximum flexibility to assemble the rack to accommodate cooking container lids of a variety of heights in an optimum storage orientation without tools, fasteners or adhesives. The design of the side elements 16 of the rack supporting frame permits maximum vertical adjustability of the rests 22 and stops 24. Each side element 16 includes a side rail or bracket member 26 which extends from the base 14 to the cap 18 of the supporting time and conforms substantially to the configuration of the side element 16, which will typically be rectangular or trapezoidal as shown. Opposite longitudinal front and rear edges 28 and 30 of the bracket members 26 include apertures 32 spaced along each edge. The apertures 32 may be substantially square as shown, round, or any other convenient shape. The apertures 32 are intended to receive correspondingly configured projections on a crosspiece 34, as will be discussed in more detail in connection with FIG. 6.

FIG. 2 illustrates the assembly position for this embodiment of the storage rack of the present invention. The base 14 has formed across its width a pair of hidden dovetail channels 15. The dovetail angle can be varied as required to produce a stronger, more stable construction. A wider dovetail angle also makes the rack components easier to assemble. These are positioned to hold the side elements 16, including the bracket members 26, in an optimum supporting location relative to the base 14. Each bracket member 26 is formed with half of a dovetail 36, 38 on opposite longitudinal ends. To assist in the custom assembly of the storage rack so that it is capable of holding a collection of diverse lids, each side element is inserted into a hidden dovetail channel 15 in the base 14. It will be noted that this requires the bracket members to be mirror images of each other. A pair of optional assembly blocks 40 and 42, each of which is formed with the remaining half of the dovetail required to match the bracket dovetail along one edge 44 may be inserted into the hidden dovetail channel 15 in the base 14 to hold the bracket members steady while the user inserts the projections of the crosspieces 34 in the apertures 32 in bracket member edges 28 and 30 as required to form the necessary arrangement of rests and stops. A lid or object to be stored in the rack will be positioned in place on its respective rest while the crosspieces forming the rests and stops for the remaining lids are positioned. The assembly blocks extend only far enough up the sides of the bracket members 26 to hold them steady while the crosspieces 34 are positioned at the desired locations along edges 28 and 30 of the bracket members. Once the crosspieces are inserted in place the assembly is stable enough to hold the lids.

Figure 5:
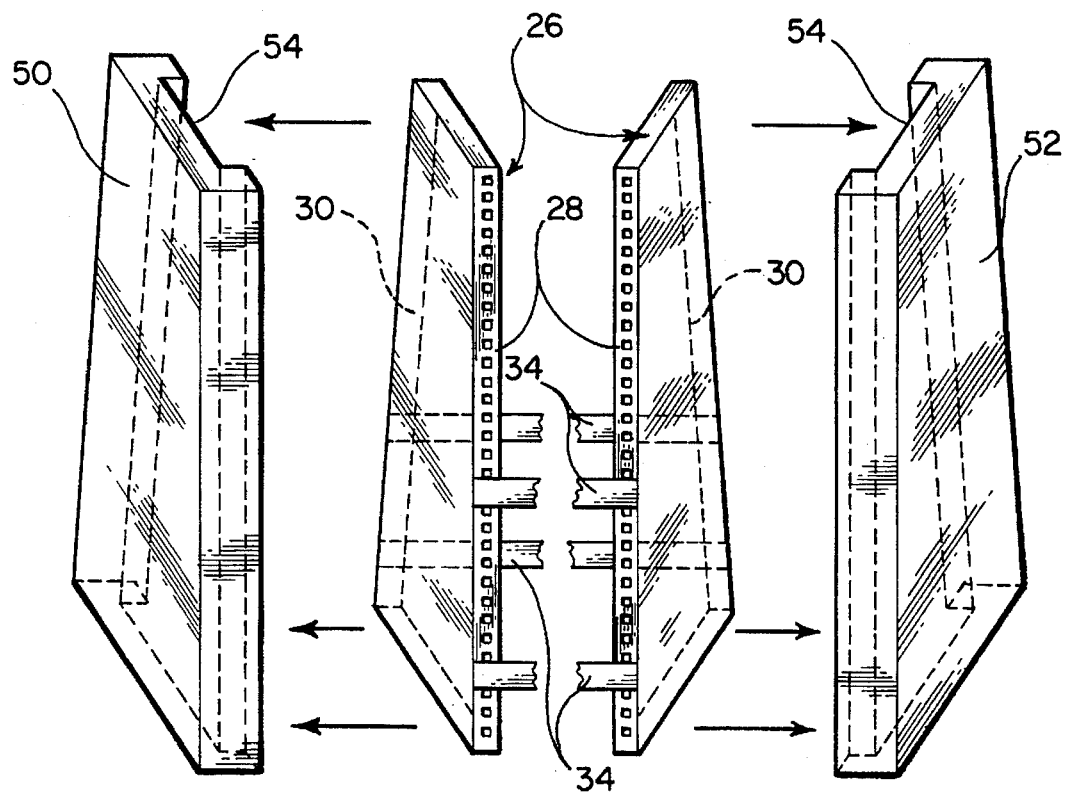
FIG. 5 illustrates an exploded perspective view of the side rails, crosspieces and the finished side frame sections of the FIG. 1 embodiment of the present invention.

The crosspieces 34 will be positioned at locations along the bracket members 26 to serve as rests 22 or stops 24. The user of the rack can easily position the crosspieces 34 in the locations along the bracket members 26 so that even a very diverse collection of cooking container lids will be supported at an optimum storage angle. The rests 22 will be located along what will be the front of the rack or edge 28 as shown in FIG. 2, and the stops 24 will be located along opposite or back edge 30. The spacing between rests can be varied by adjusting the amount of space left between rests. This is usually done with the lid in place on the rack. Once the required numbers of rests and stops for the number of lids to be stored has been attached to the bracket members 26, the lids are removed from the rack, and the assembly blocks 40 and 42 are removed from the base. The bracket and crosspiece subassembly is also removed from the base, and side frame pieces 50 and 52, which are shown and described in connection with FIG. 5, are snapped over the bracket members. This assembly is then inserted into the hidden dovetail channels 15 in the base 14 from the rear of the assembly. The cap 18, which includes hidden dovetail channels (not shown) like those in the base 14, is secured to the bracket members 26 and side frame pieces 50 and 52 by sliding the dovetails formed by these structures into the corresponding channels from the rear of the cap. Locking pins 46 and 48, which are preferably formed of wood, are inserted into channels (not shown) in the cap 18, side frame pieces 50 and 52, and base member 14 to prevent sliding of the assembly in the dovetail channels. A locking pin 46 is inserted at an angle through each of the side frame pieces 50, 52 into the base 14. One locking pin 48 is inserted into each side frame piece 50, 52 through the cap 18. Four locking pins will hold the rack securely together and will prevent sliding of the side frame pieces and brackets in the dovetail channels of the base and cap, even when very heavy lids are stored in the rack.

FIG. 4 illustrates the present storage rack 10 in a different orientation from that shown in FIG. 1. FIG. 4 illustrates in more detail the optimum storage angle of the cooking container lids 12 stored in the rack 10. The rack 10 in the position shown in FIG. 4 is particularly well suited for use as a custom cabinet component. The rack could be secured to a sliding shelf which would be pulled out of the cabinet to allow the cook access to the lids. Alternatively, the rack could be attached to a horizontal track or placed in a deep drawer. Other methods of adapting the rack 10 to fit inside kitchen cabinets so that it will hold cooking container lids in the spaced, angled orientations described herein are also contemplated to be within the scope of the present invention. When the rack 10 is placed in this horizontal orientation, the base end of the rack is spaced upwardly from a horizontal surface by the base feet 20. The top end of the rack, however, directly contacts the surface. This spacing of the rack from the countertop, table, or other horizontal surface permits the rack to accept larger diameter lids near the base of the rack so that these lids will not contact the surface. As a result, any possibility of damage to a horizontal surface, such as a kitchen countertop, from the lids is eliminated.

If the rack 10 is hung vertically on a wall, the base feet 20 will also space the lower part of the rack away from the wall surface so that large diameter lids can be stored without damaging the surface of the wall.

FIG. 5 illustrates the side elements 16 including the bracket members 26, side frame pieces 50 and 52, and the crosspieces 34 of the lid storage rack 10 of the present invention in an exploded front perspective view. The side frame pieces 50 and 52 are mirror images and each is formed with a recess 54 sized to receive a corresponding bracket member 26. The dovetail cuts which are preferably made in the side frame pieces 50 and 52 to facilitate assembly are not shown in FIG. 5. The side frame pieces are preferably made of a high grade finished wood, such as birch, cherry or oak, for example. The apertures on the bracket members 26 and the ends of the crosspieces 34 slide into the side frame pieces and are covered by the side frame pieces when the rack is fully assembled, as shown in FIGS. 1 and 4. The base 14 and the cap 18 will be formed of the same type of finished wood to give the rack an aesthetically pleasing decorative appearance. The wood for the rack can be selected to match kitchen cabinetry, if desired. The brackets 26 and crosspieces 34 are preferably made of plastic colored to compliment the color of the finished wood. Crosspieces 34, which, as described above, can function as rests or stops, depending on where they are installed relative to each other and the front of the rack, are attached to the bracket members 26 by snapping the pair of projections 35 provided on one side of each crosspiece 34 (FIG. 6) into the correspondingly configured apertures 32 in the bracket members. Placement of the crosspiece projections in corresponding apertures 32 in brackets 26 so that the crosspieces are level is facilitated by the provision of indicators (not shown), such as numbers or color coding, on bracket edges 28 and 30 at intervals associated with the apertures. This eliminates the requirement for counting the apertures to determine proper spacing. Each side of the crosspiece and bracket member assembly thus formed is inserted into a correspondingly configured side frame piece 50, 52. This assembly is then secured to a base and a cap, such as base 14 and cap 18 of FIG. 1. The rack may be easily disassembled and reassembled so that it can be adjusted to hold lids of different heights than those it was originally set up to hold.

The design of the present invention allows the bracket elements 26 (FIGS. 3 and 5) and the crosspieces 34 to be made of a material, for example plastic, that is lighter in weight than wood. The side frame pieces 50 and 52 would then be made of a finished wood or other suitable material to provide the necessary stability and a suitably decorative finished appearance to the rack.

Figure 7:
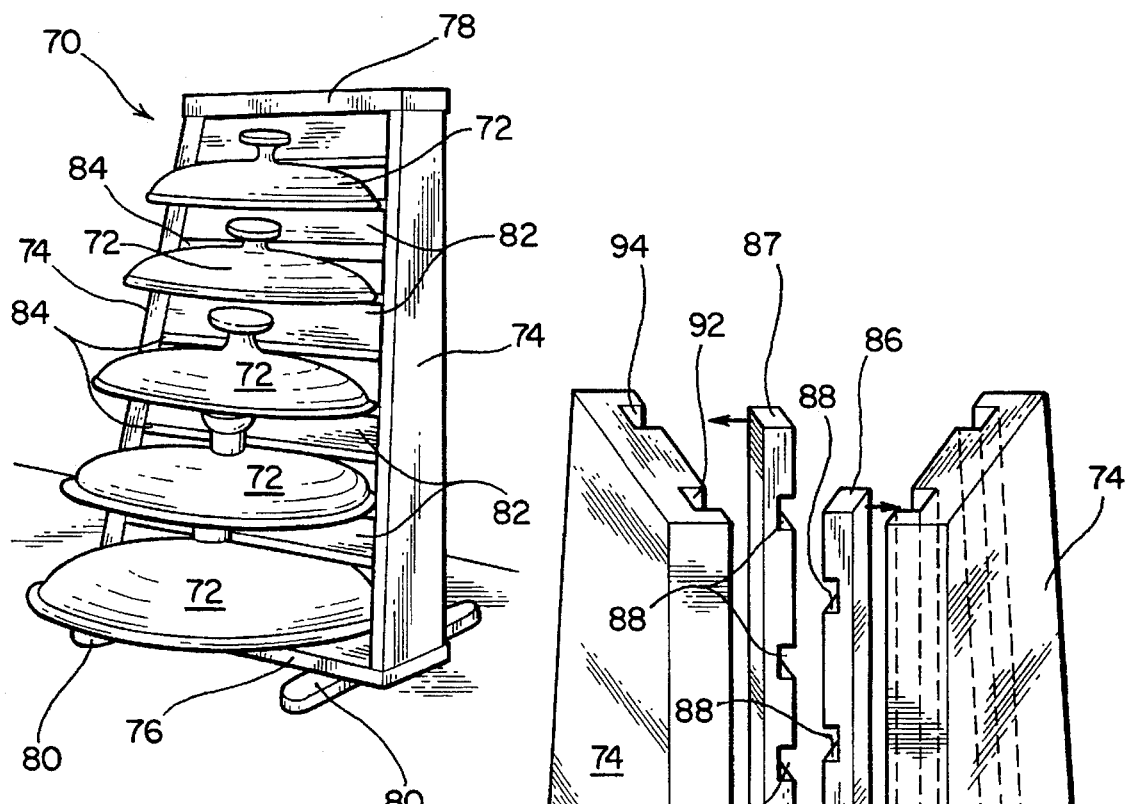
FIG. 7 illustrates a front perspective view of a second embodiment of a storage rack in accordance with the present invention, wherein the structural components are fixed in place and nonadjustable.

FIG. 7 illustrates another embodiment of a cooking container lid storage rack 70 according to the present invention. This rack is not adjustable, but is designed to hold the lids 72 from a matched set of cookware manufactured by a single manufacturer and may be provided to the consumer already assembled. Typically, such a set of lids may differ in diameter, but each lid has substantially the same height. Therefore, the rack 70 may be constructed in a substantially trapezoidal shape with two substantially equal sides and a longer base than cap, and the locations of the rests and stops can be permanently fixed in place. The rack 70 shown in FIG. 7 has two equal sides 74 and a longer bottom member 76 than cap 78. As in the FIG. 1 embodiment, a pair of base feet 80 provides stability and the requisite spacing of the rack from a horizontal or vertical surface. Rests 82 and stops 84 support the lids 72 at an optimum storage angle.

Figure 8:
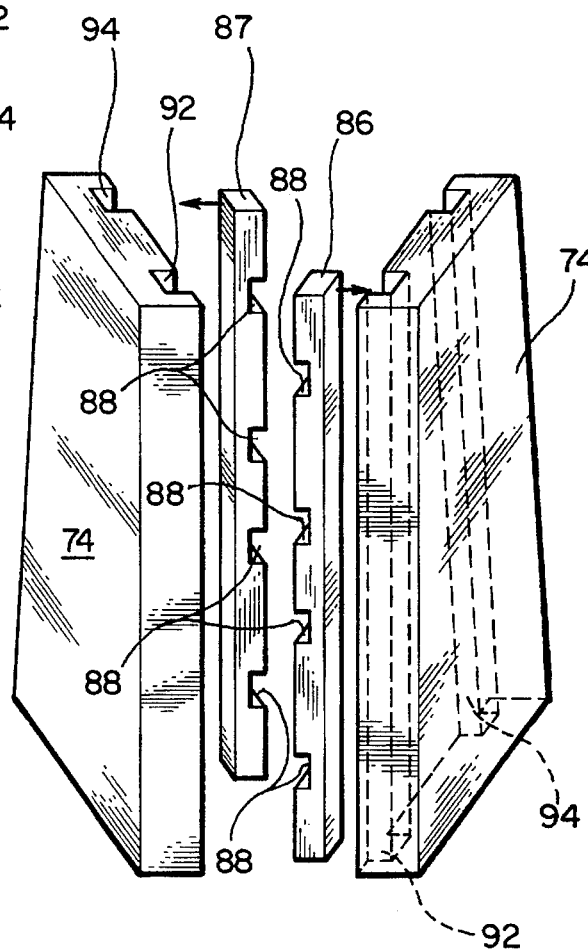
FIG. 8 illustrates the side rails and finished side frame sections of the FIG. 7 embodiment of the present storage rack.
Figure 9:
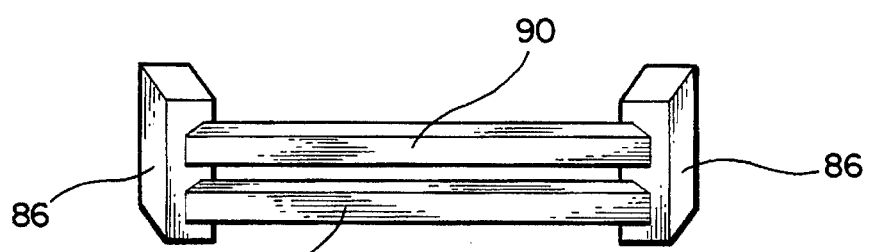
FIG. 9 illustrates a front view of the crosspieces and side rails of the FIG. 7 storage rack.

FIGS. 8 and 9 illustrate a different kind of side rail or bracket member 86 from those shown in FIGS. 3 and 5 that can be used with the FIG. 7 embodiment. Because each one of a set of lids from a single manufacturer has the same height, the adjustability desired for storing a set of diverse lids is not necessary, and the bracket members 86 and 87 can be formed with receptacles 88 specifically positioned to receive the crosspieces 90 forming the rests 82 and stops 84 for a particular set of lids. A set of four bracket members, from brackets 86 and rear brackets 87, only two of which are shown in FIG. 8, is required for this arrangement. Each of the side elements 74 is formed with a pair of longitudinal channels 92 and 94, which extend from the top to the bottom of each side element 74. The receptacles 88 are precut for a specific brand of lids to produce the correct lid angle and the optimum spacing of the rests and stops. The side elements 74 will also preferably include dovetail cuts adjacent to the upper and lower edges like those shown in FIG. 3.

As shown in FIG. 9, the crosspieces 90 are inserted in the receptacles 88 precut in a pair of front bracket members 86 to position the rests 82. This subassembly is slid into the from channels 92 in the side elements 74. Crosspieces are then inserted into the receptacles precut in a pair of rear bracket members 87 to position the stops 84, and this subassembly is slid into the rear channels 94 in the side elements 74. The base 76 and cap 78 are attached to the side element and crosspiece assembly to complete the assembly of the rack 70.

Maintaining the stored lids at an optimum angle is insured not only by the relative positions of the rests and stops, but also by the orientation of the side elements relative to the base of the storage rack. This can best be seen in FIGS. 4 and 7. To provide optimum support for a number of lids, particularly in the vertical orientation shown in FIGS. 1 and 7, and to maintain the stored lids at an angle that will keep them in place, yet allow their easy insertion and removal, the angle between the side elements and the base should preferably be within the range of about 6° to 16°.

A preferred embodiment of the storage rack of the present invention is shown in FIGS. 10-15. This embodiment combines the ease of assembly and adjustability of the FIG. 1 embodiment with ease and reduced cost of manufacture. In this embodiment a pair of side rails replaces a bracket member. A universal, longitudinally adjustable crosspiece is provided so that different lengths of crosspieces are not required when the rack is made in a trapezoidal shape to accommodate lids of different diameters as in the FIG. 4 embodiment. The use of the longitudinally adjustable crosspiece permits the manufacture of a fully adjustable, easily assembled storage rack with a trapezoidal configuration as well as with a rectangular configuration.

Figure 10:
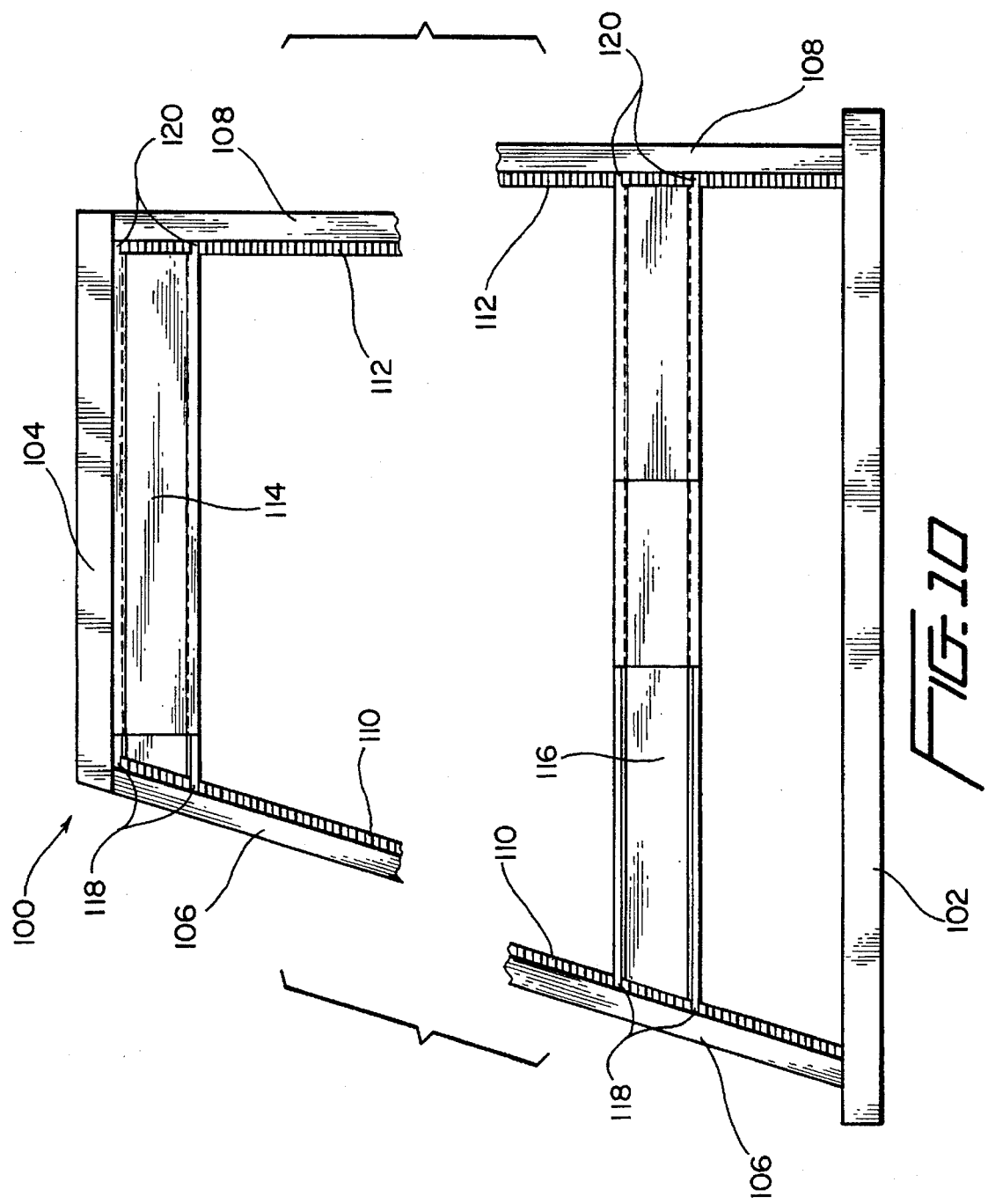
FIG. 10 illustrates, in front view, the side rails and adjustable crosspieces mounted in accordance with a preferred embodiment of the storage rack of the present invention.

FIG. 10 illustrates, in side view, one configuration of a fully adjustable storage rack 100 which will hold lids of different diameters. The horizontal dimension between the side elements is graduated, with the largest dimension at the base and the smallest dimension at the cap. Although the storage rack is described with respect to this particular configuration, which shows each side element positioned at a different angle relative to the base, it is more cost effective to produce a storage rack wherein both side elements are secured to the base at the same angle. Preferred angles are 90°, which will give the storage rack a rectangular configuration, and about 7° to 8° from the vertical or 82° to 83° from the base, which will give the storage rack a trapezoidal configuration.

The storage rack 100 includes a base 102 and a cap 104 with side elements 106 and 108 extending from the base to cap. Each side element includes a pair of parallel grooves (not shown) similar to the grooves shown in FIG. 8 which are configured to receive side rails which extend from the base to the cap. The side rails 110 and 112 which are closest to the front of the storage rack are shown in FIG. 10. The side rails 110, 112 are preferably made of a flexible, durable plastic which can be formed as described in connection with FIGS. 11, 12 and 13 and easily handled and installed on the rack by the user. The side rails are formed with a series of alternating grooves and projections as will be described in detail below and include on the surface inserted into the grooves in the side element a number of bosses spaced at intervals along the length of each side rail. When the side rails are press fitted into the grooves, the bosses help to hold the rails in the grooves. To enhance ease of manufacture and reduce manufacturing costs, each side rail is preferably formed in two sections which together extend from the base 102 to the cap 104 of the storage rack. A single piece, unitary side rail could also be used instead of the two sections.

Two longitudinally adjustable crosspieces 114 and 116 are shown engaging the side rails 110 and 112. The length of each crosspiece can be adjusted as will be explained in detail below to extend between and engage a side rail on each side element. The crosspieces 114 and 116 are shown engaging the front side rails 110 and 112 and will, therefore, function as stops as described above in connection with FIGS. 1, 4 and 5. Other crosspieces will be positioned to engage rear side rails (not shown) to serve as rests as described above, also in connection with FIGS. 1, 4 and 5. Each crosspiece is formed with a pair of tabs 118, 120 on each opposite end. The tabs are configured to engage corresponding grooves in each side rail 110, 112 to secure the crosspiece in place horizontally in the storage rack. Reference marks (not shown) are preferably placed on each side rail to facilitate the horizontal alignment of the crosspieces. The crosspieces are easily adjustable vertically between the side rails to the spacing required to form the rests and stops which support each lid. The tabs 118, 120 on the crosspieces 114, 116 snap into and out of the grooves in each side rail so that the crosspieces can be moved toward the base or toward the cap as needed to accommodate a lid of a particular height. The crosspieces are, therefore, infinitely adjustable vertically as well as horizontally. Although the vertical adjustability of the crosspieces has been described with respect to the front of the storage rack, the rear crosspieces are similarly vertically adjustable.

Figures 11, 12, 13:
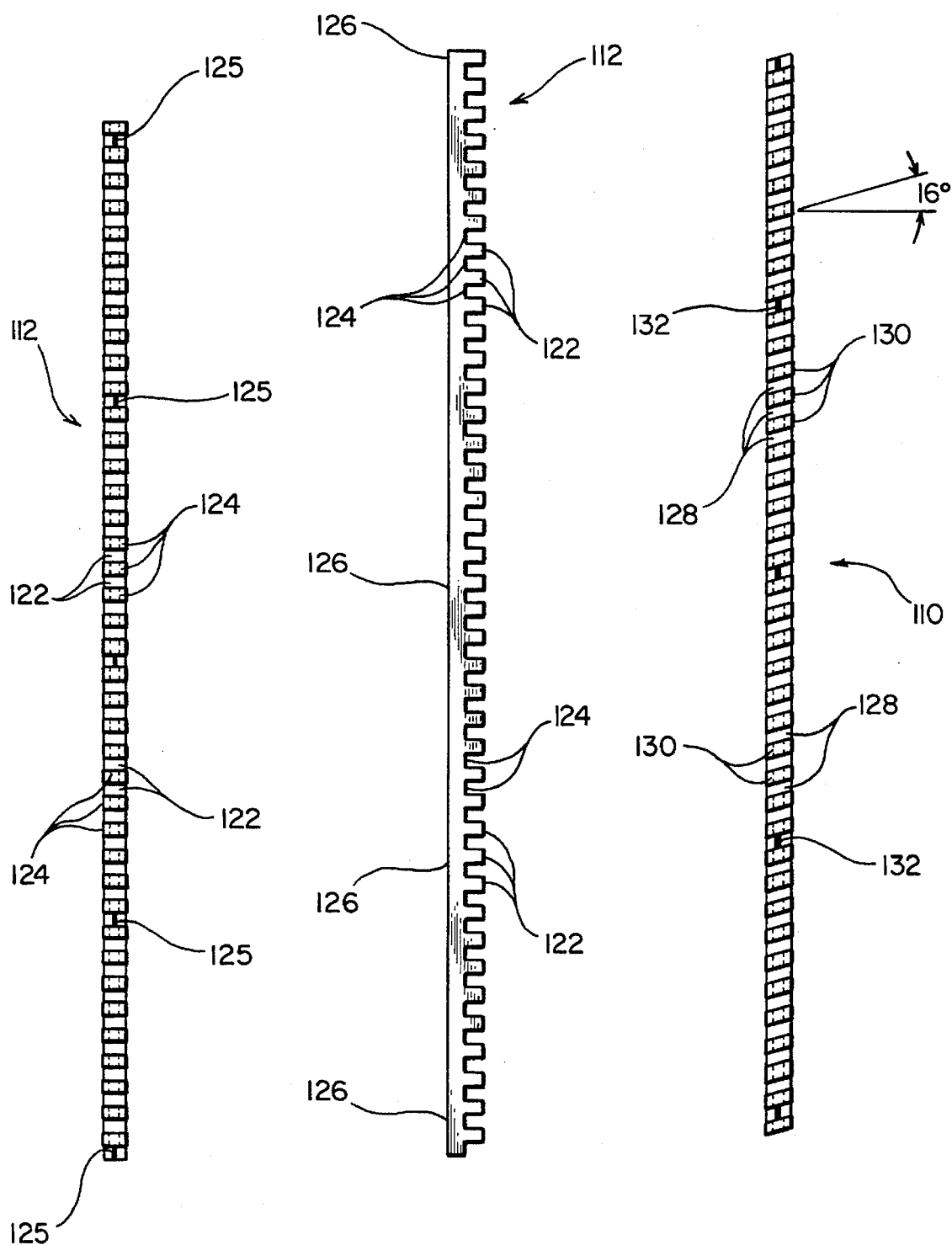
FIG. 11 illustrates, in top view, a first configuration of a side rail in accordance with a preferred embodiment of the present invention.
FIG. 12 illustrates a side view of the side rail of FIG. 11.
FIG. 13 illustrates, in top view, a second configuration of a side rail in accordance with a preferred embodiment of the present invention.

FIGS. 11, 12 and 13 illustrate the configurations of the side rails 110 and 112. Side rail 112 is shown in top view in FIG. 11 and in side view in FIG. 12. Alternating regular projections 122 and grooves 124 extend along the entire length of the side rail 112. The spacing between the grooves 124 will be selected to correspond to the spacing between the tabs 118, 120 on crosspieces 114, 116 so that each tab in the pair will engage a groove when the vertical position of the crosspiece is changed. In addition, the side rails must be aligned so that when all four tabs on a crosspiece are engaged by grooves, the crosspiece will be horizontally aligned. The grooves and projections are formed at right or 90° angles to each other. The positions 125 of the bosses 126, which hold the side rail 112 in place in the side element, are shown in FIG. 11. The profile of the projections and grooves is shown in FIG. 12.

FIG. 13 illustrates a second configuration of side element 110 in which the projections 128 and grooves 130 are formed at an angle. The angle shown in FIG. 12 is 16°. This angle should correspond to the positioning angle of the side element in which the side rail is installed. Side element 106 is positioned at 16° from the vertical or 74° from the base. Therefore, the angle of the alternating projections and grooves is also 16°. However, other angles could be selected, depending on the desired configuration of the storage rack. If a rectangular rack is desired, the angle of both side elements and side rail projections and grooves will be 90° from the base. If a more trapezoidal shape is desired, the angle can be selected accordingly. An angle of 7°–8° from the vertical or 82°83° from the base for both side elements and, therefore, the side rail projections and grooves has been found to be especially useful. The positions 132 of the bosses (not shown) for side rail 110 are also shown in FIG. 12. In profile, the projections 128 and grooves 130 are angled upwardly to conform to the selected angle, as shown in FIG. 10.

FIGS. 14 and 15 illustrate a universal crosspiece 140 which is identical in construction to the crosspieces 114 and 116 of FIG. 10. The longitudinal adjustability of the crosspiece 140 allows the use of a single size crosspiece to form all of the rests and stops for the lid storage rack of the present invention. The crosspiece 140 includes two telescoping sections 142 and 144 which slidingly engage each other.

An area of overlap of sections 142 and 144 is defined between the end 143 of section 142 and the end 145 of section 144. The longer the area of overlap, the stronger the crosspiece will be. The length of the crosspiece sections 142, 144 will be selected accordingly.

A friction locking mechanism 146 holds the crosspiece 140 at the desired length while the tabs 148, 150 are inserted into selected grooves in the side rails to position the crosspiece horizontally in the rack. The elements of the friction locking mechanism 146 are shown in cross-section in FIG. 15. A toothed, serrated strip 152, which is visible in FIG. 14, is formed on the surface that is intended to be the inner surface of one crosspiece section 144. The corresponding crosspiece section 142 is formed with a number of correspondingly configured friction locking pins 154 spaced at intervals along the surface facing the toothed strip 152. The friction locking pins 154 engage the toothed strip at those locations where they overlap to limit the sliding telescoping movement of the crosspiece sections 142 and 144 and maintain the selected crosspiece dimension.

The sections 142 and 144 of crosspiece 140 may be held together so that they slide and the crosspiece can be shortened and extended in a number of ways. For example, section 142 can be provided with top and bottom lips 156, 158, and section 144 is sized to fit within and be slidingly engaged by the lips so that the crosspiece sections will telescope and extend as required.

One edge 160 of the crosspiece shown in FIG. 14 is formed at an angle. This is the same angle from the vertical selected for the side elements and side rails to allow the edge of the crosspiece to fit the flush against the side elements. The opposite edge 162 is shown to be straight. However, both crosspiece edges could be angled or straight (90°), depending on the selected configuration of the storage rack.

The crosspieces are preferably formed from suitable durable plastic materials. The smallest dimension of each crosspiece will be smaller than the smallest crosswise dimension of the storage rack. In addition, the largest dimension of each crosspiece will be larger than the largest crosswise dimension of the storage rack. Exemplary smallest and largest dimensions are 6½ inches and 11 inches, respectively. These dimensions should accommodate most commercially available container lids.

In the foregoing preferred embodiment of the present lid storage rack, the side elements are preferably formed and secured to the base so that the entire rack leans about 10° toward the support surface.

The largest lid used in most home kitchens is about 10 inches in diameter. Therefore, the length of the base member between the side frame pieces should be long enough to comfortably receive a lid this size. If the rack is intended to be used in a vertical orientation as a free-standing unit on a kitchen countertop, its height must not exceed 23 inches, which is the maximum height that will fit between the countertop and the upper kitchen cabinet. A rack of this size will hold up to five lids. However, the size could be varied to hold any number of lids and to fit in any environment.

The storage rack of the present invention may be constructed of a variety of different materials. All of the components may be made of wood, such as oak or pine or the like, that can be stained or painted as desired to provide a decorative touch to a kitchen. If the rack is intended for use as a custom cabinet component, at least the support frame will also most likely be made of wood. As discussed above, some of the components or the entire rack, particularly the bracket members, side rails and crosspieces, could be formed of a suitable durable plastic. It is contemplated to be within the scope of the present invention to form these components of plastic, metal or any other suitable material and the supporting frame components of wood, metal or another suitable material. The choice of materials will depend, to a large extent, on the end use of the rack of the present invention. More decorative materials are likely to be preferred in home kitchens, while materials that are easily cleaned and sanitized will be preferred in commercial kitchens.

The present invention has been described herein with respect to preferred embodiments. However, modifications and variations of these embodiments which perform the same function are also contemplated to be within the scope of the present invention.

Industrial Applicability

The present invention will find its primary application in enhancing the storage capabilities and organization and reducing clutter in home and commercial kitchens. Its adjustability and multiple position versatility is not limited to kitchen use, however. The cooking container lid storage rack described herein can also be effectively used as a store display rack to display cookware lids, covers, dishes or similarly shaped objects. Although its primary utility is directed to the storage and display of container lids, the present rack is also well suited to hold and display any substantially planar article or object which the design can effectively accommodate.

I claim:

1. A storage rack positionable in a substantially vertical orientation or in a substantially horizontal orientation for storing and securely holding within said rack at an optimum storage angle when said rack is positioned in either said substantially vertical orientation or said substantially horizontal orientation a number of container lids or like-shaped objects, said rack including:

(a) a frame configured to position said rack alternatively in said substantially vertical orientation or in said substantially horizontal orientation, wherein said frame includes a pair of opposed longitudinal side elements removably attached between a base member and a cap at a selected angle relative to said base and each of said side elements includes a pair of spaced grooves extending longitudinally between the base member and the cap;

(b) a number of side rails configured to removably engage each of the pair of grooves in each of said pair of side elements, wherein each said side rail includes along one surface of its entire length alternating projections and grooves; and (c) a plurality of longitudinally adjustable crosspieces, each of said crosspieces having means for extending said crosspiece to a selected dimension between a selected smallest dimension and a selected longest dimension and including opposed edges removably engaging said alternating projections and grooves of opposed side rails in opposed side elements at a support angle and wherein at least one crosspiece engages each side rail.

2. The storage rack described in claim 1, wherein each of said side elements is attached to said base member to form a selected angle of 90° between said side element and said base member.

3. The storage rack described in claim 2, wherein the projections and grooves on said side rails are oriented at right angles to the side elements.

4. The storage rack described in claim 1, wherein each said side rail includes a number of spaced bosses on the surface opposite said projections and grooves.

5. The storage rack described in claim 1, wherein each of said side elements is attached to said base member at a selected angle from 74° to 83° between said side element and said base member.

6. The storage rack described in claim 5, wherein said the projections and grooves on said side rails are oriented at an angle from between about 7° to about 16°.

7. The storage rack described in claim 1, wherein each crosspiece includes two slidably engaged telescoping sections that extend between said smallest and said longest dimension, each of said sections including cooperating locking structure to secure said crosspiece in said selected dimension.

8. The storage rack described in claim 7, wherein said locking structure includes a plurality of teeth positioned on a surface of one of said sections and a number of correspondingly configured friction tabs on a facing surface of the other section spaced at intervals along the length of said facing surface so that said tabs engage said teeth when said sections are extended to said selected distance.

9. The storage rack described in claim 8, wherein said side rails and said crosspieces are formed from plastic and said frame is formed from wood.

10. The storage rack described in claim 7, wherein each telescoping section has a side rail engaging edge including at least two spaced groove-engaging tabs, and each side rail engaging edge is configured to correspond to said selected angle.

11. The storage rack described in claim 1, wherein said base includes a pair of feet attached perpendicularly to said base and sized to stabilize the base and to maintain the base of the rack a spaced distance from a horizontal or vertical surface supporting the rack.

12. The storage rack described in claim 1, wherein the side elements are attached to the base member so that the side elements are parallel to each other and are inclined at an angle of about 10° with respect to the base member.

13. The storage rack described in claim 1, wherein the side elements are attached to the base member so that said side elements are parallel to each other and the frame has a rectangular configuration.

14. The storage rack described in claim 1, wherein each side element is attached to the base member at an angle of about 7° to 8° and the frame has a trapezoidal configuration.

15. The storage rack described in claim 1, wherein one side element is attached to the base member at an angle of about 16° and the other side element is attached to the base member at an angle of 90°.

16. The storage rack described in claim 1, wherein said side elements, said base and said cap are formed from wood and said side rails and crosspieces are formed from a material that is lighter in weight than wood.

17. The storage rack described in claim 1, wherein each of a number of said crosspieces corresponding to the number of lids to be stored in the rack is secured at spaced intervals between a pair of side rails located near a front edge of the frame to form stops and each of a number of said crosspieces corresponding to the number of lids to be stored is secured at spaced intervals between a pair of side rails located near a rear edge of the frame to form rests holding said lids at an optimum storage angle.

18. A storage rack positionable in a vertical orientation or in a horizontal orientation for storing and holding securely within said rack at an optimum storage angle a matched set of cooking container lids that are substantially the same height, but have different diameters, said rack including a support frame capable of positioning said rack alternatively in a horizontal or a vertical orientation, said support frame including a pair of opposed longitudinal side elements extending between a base and a cap, wherein each said side element includes a pair of spaced longitudinal channels for receiving a pair of side rails with alternating projections and grooves along the length thereof, and a plurality of telescoping adjustable crosspieces engaging said alternating projections and grooves of said side rails and forming lid-holding rests and stops in selected fixed positions perpendicularly between said side elements and wherein at least one crosspiece engages each side rail.

19. The storage rack described in claim 18, wherein each said side element is secured to said base at an angle of 6° to 13°.

20. The storage rack described in claim 19, wherein said base includes a pair of spaced feet sized to prevent the lid with the largest diameter from contacting a horizontal or vertical surface supporting said rack.

* * * * *